3,141,471
PROPORTIONING ASSEMBLY
Hilding V. Williamson, Chicago, Ill., assignor to Chemetron Corporation, Chicago, Ill., a corporation of Delaware
Filed Jan. 2, 1962, Ser. No. 163,841
7 Claims. (Cl. 137—114)

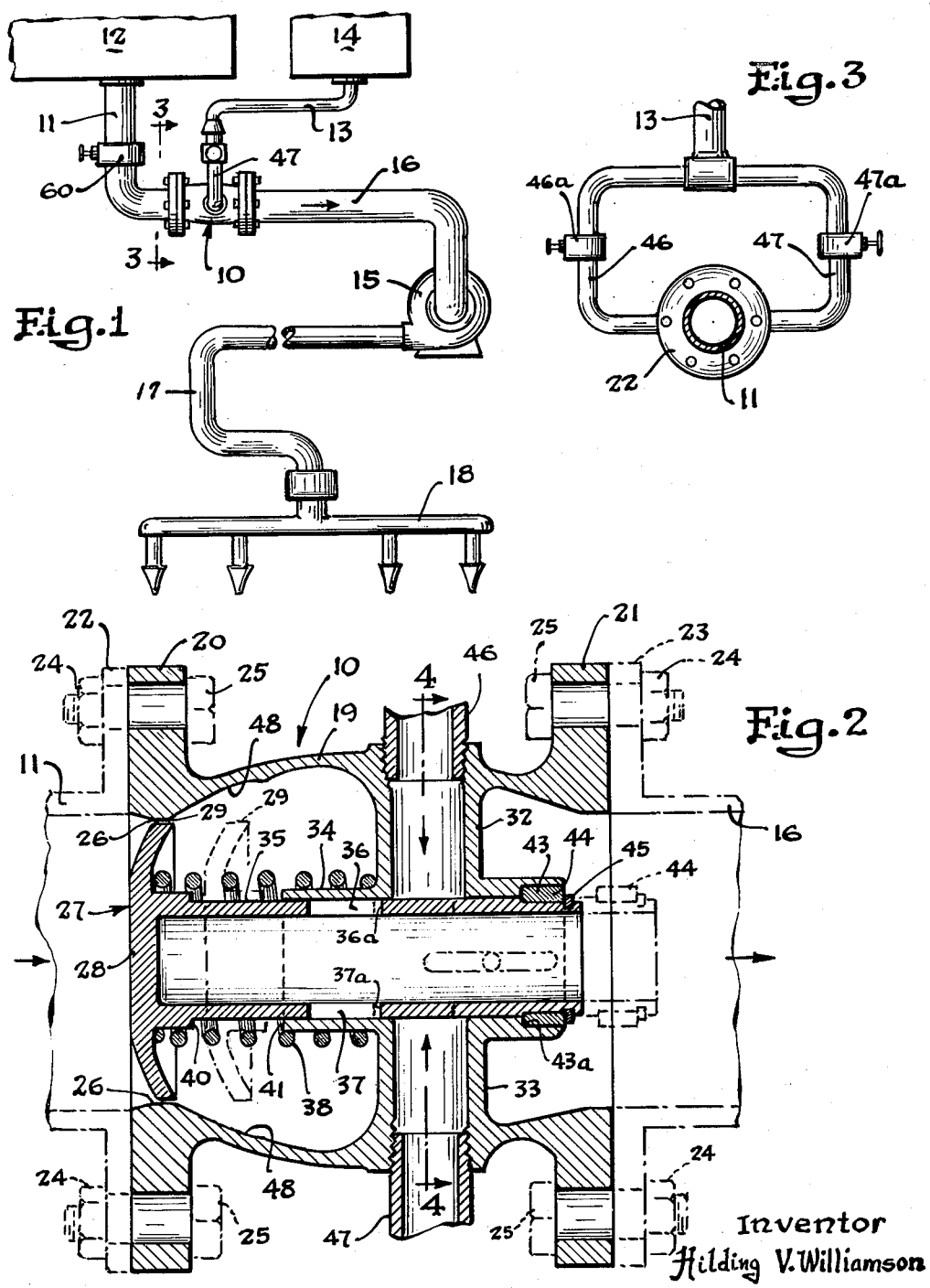
July 21, 1964 — H. V. WILLIAMSON — 3,141,471
PROPORTIONING ASSEMBLY
Filed Jan. 2, 1962 — 2 Sheets-Sheet 1
Inventor
Hilding V. Williamson July 21, 1964   H. V. WILLIAMSON   3,141,471
PROPORTIONING ASSEMBLY
Filed Jan. 2, 1962   2 Sheets-Sheet 2
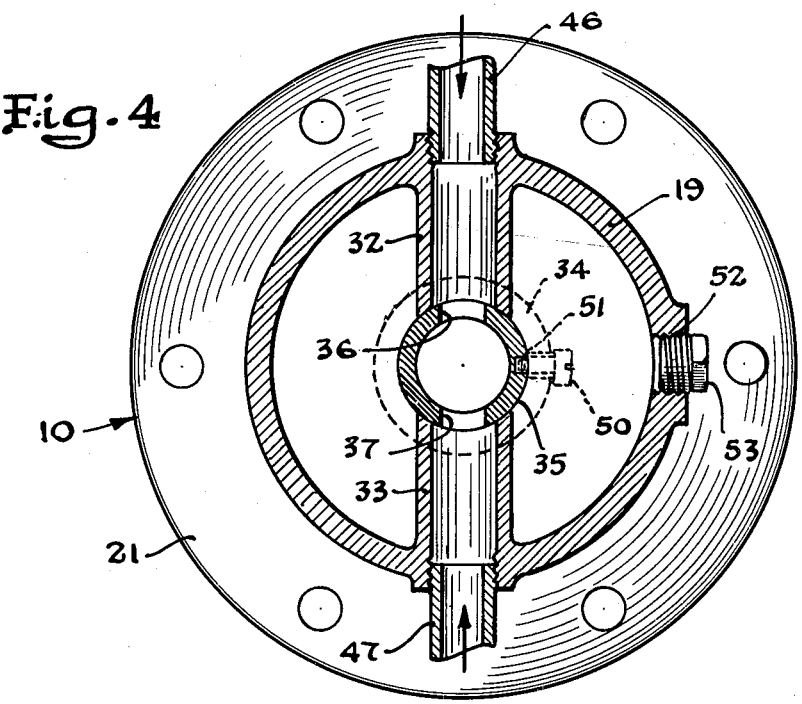
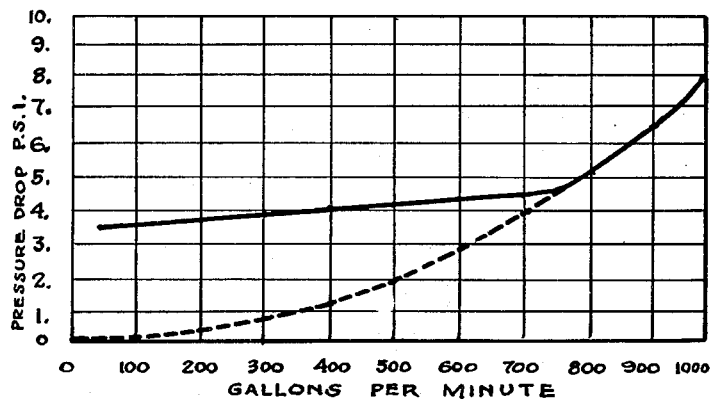
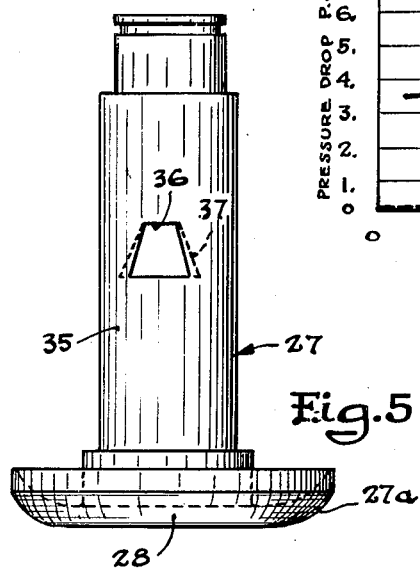
Inventor
Hilding V. Williamson
By
Attorney United States Patent Office 3,141,471
Patented July 21, 1964

This invention relates to an assembly for proportioning fluids in a flow conduit. More particularly, this invention is concerned with a proportioning valve adapted to mix a foam stabilizing agent with water in predetermined ratios for producing foam for fire fighting purposes.

There are currently in use several types of valving devices for proportioning foaming agents with water. Some of the devices, while providing proper proportioning within restricted ranges of flow of water, are not adaptable for accurate proportioning over a wide range of flow. Many of the devices of the type concerned within this invention are, in addition, complex in their construction and consequently costly to manufacture and to maintain. Further, it is highly desirable that a valving device be easily adapted to proportioning different ratios of materials. The utility of a proportioning valve is highly diminished if its operating mechanism must be substantially altered in order to effect the desired different ratios of fluids.

It is therefore, an object of the present invention to provide a proportioning device for liquids which functions accurately over a wide range of flow.

It is another object of this invention to provide a proportioning valve for dissimilar liquids or similar liquids in different amounts which is simple in construction and consequently economical to manufacture and maintain.

It is still another object of this invention to provide a foam proportioning mechanism which is adaptable to delivering different ratios of foam producing and stabilizing fluids.

It is also an object of this invention to provide a proportioning device which, when it is positioned in the flow path of a water line, will permit a high rate of flow without exceeding reasonable pressure drop requirements.

The foregoing objects and other objects of the present invention will be readily appreciated by reference to the following detailed description when considered in conjunction with the accompanying drawings wherein:

FIGURE 1 is a diagrammatic view in side elevation illustrating the manner in which the valving device of the present invention is connected to two sources of different liquids. The valving apparatus communicates with the suction side of a pressure pump with the pressure side of the pump leading to a bank of foam producing nozzles.

FIGURE 2 is a view in horizontal section of the present proportioning valve.

FIGURE 3 is an end view of the valving device taken along line 3—3 of FIGURE 1.

FIGURE 4 is a sectional view taken along line 4—4 of FIGURE 2.

FIGURE 5 is a view in side elevation of the piston employed in the proportioning valve of the present invention.

FIGURE 6 is a graph plotting the flow rate of the present valving device against the pressure drop.

Briefly stated, the apparatus of this invention is comprised of a tubular housing providing an inlet portion and a passage therethrough. A piston having a hollow stem portion and a head adapted to substantially close the inlet port is axially aligned with the port by means of a stationary sleeve within the housing which receives the hollow stem in a slidable manner. The stationary sleeve has two intake conduits in communication with the sleeve and the stem of the piston has two slots for registration with the conduit when the piston head is moved away from the inlet by the flow of fluid through the housing. The internal wall of the housing adjacent the valve seat is designed to provide a constantly increasing opening between the piston head and the wall while at the same time the slots in the piston stem are designed to provide constantly increasing areas of registration with the conduit. Secondary fluid will thereby flow into the hollow stem member and out through the rear of the piston where it will mix with the primary fluid flowing through the tubular housing.

Proceeding to a detailed description of the present invention, the proportioning valve generally 10, as shown in FIGURE 1, communicates by means of pipe 11 with a tank 12 containing a primary source of fluid such as water, and by means of pipe 13 with a second tank 14 containing a secondary fluid such as foam producing and stabilizing agent. A centrifugal pump 15 is connected to pipe line 16 on the intake side and pipe 17 leads from pump 15 to a bank of aspirating nozzles 18 on the pressure side.

As best illustrated in FIGURE 2, proportioning valve 10 is formed with a generally cylindrical, tubular housing 19. In this instance it is fabricated from bronze. Pipe lines 11 and 16 are secured in axial alignment with valve 10, at opposite ends, by means of flanges 20 and 21 on valve 10, and flanges 22 and 23 of lines 11 and 16, respectively. Nuts 24 and bolts 25 provide the necessary attachment. Tubular housing 19 provides an inlet port 26 near the point of communication between pipe 11 and housing 19. A piston, generally 27 has a head portion 28 in alignment with inlet portion or port 26 and substantially closes port 26. A slight clearance is provided between the lateral edge 29 of the piston head and the inlet port. Two oppositely disposed conduit members or conduits 32 and 33 are integrally molded in tubular housing 19 and also to an annular valve sleeve 34. A hollow step portion 35 of piston 27 is slidably received by a longitudinally extending sleeve 34 and is generally centrally disposed within the internal wall and axially aligned with inlet port 26. The stem 35 is open at one end to provide communication with any liquid which is passed through the inlet port 26. Two diametrically opposed slots or ports 36 and 37 are provided in stem portion 35 to register simultaneously with conduit members 32 and 33 respectively, when piston 27 is moved in a direction toward the conduit members. The conduits 32 and 33 extend from the internal wall substantially at the place of greatest transverse dimension and join the sleeve 34 for registration with ports 36 and 37 so that liquid pressure drop as the liquid flows past the conduits 32 and 33 is minimized. This is accomplished by having the most remote edges 36a and 37a placed at the same distance from the piston head. A coil spring 38 is placed between conduit members 32 and 33 and piston head 28 to serve as a biasing means. Piston 27 has a shoulder 40 adjacent the head portion 28 for engagement with a stop face 41 on the outer end of sleeve 34 which forms a limiting stop means for piston 27 as when it moves away from inlet port 26.

It will be seen from the drawing that sleeve 34 extends in opposite directions from conduits 32 and 33. That portion of sleeve 34 which extends away from inlet port 26 has a compartment 43 for accommodating a metallic ring 44 secured to stem 35 and retained thereon by means of a smaller ring 45. The engagement of ring 44 with shoulder 43a of compartment 43 prevents piston head 28 from extending beyond housing 19. As will be explained later, this arrangement also provides a dash-pot for piston 27.

Conduit members 32 and 33 are disposed approximately 180° from each other and are threadably engaged by two pipe lines 46 and 47, respectively. Pipe 13 joins pipe lines 46 and 47 with valves 46a and 47a, respectively, in a T arrangement to carry second fluid from tank 14. This is best illustrated in FIGURE 3.

Tubular housing 19 adjacent inlet port 26 has tapering wall portion 48 which tapers inwardly in a divergent manner towards the interior of the tubular housing. The preferred angle of taper is approximately 26°. This This provides an ever increasing inlet area as the piston head moves away from inlet port 26. Slots 36 and 37 are dimensioned to communicate with conduits 32 and 33 in proportion to the size of the inlet area.

As best shown in FIGURE 4, a screw 50 is threadably engaged in sleeve 34 and rides in a longitudinally extending slot 51 in stem 35. This prevents any transverse or rotational movement of stem 35 in sleeve 34. It will be apparent that any transverse movement will prevent slots from registering fully with conduits 32 and 33 in the desired manner. Since tubular housing 19 along with conduits 32 and 33 are molded as an integral unit, some means of placing screw 50 in sleeve 34 and slot 51 must be provided. This is accomplished by an opening 52 which is sealed off by threaded plug 53.

Referring to FIGURE 5, it will be seen that piston 27 has two trapezoidial slots 36 and 37 in stem 35 one of which has a larger area than the other, namely 37. This design provides for different proportions of secondary fluids to be mixed with the primary fluid. For example, if pipe lines 46 and 47 remain in an open condition one given amount of secondary fluid will be proportioned to the primary fluid. If pipe line 47 is closed by means of a valve 47a another predetermined proportion will be delivered through slot 36 by means of line 46 and still another proportion if pipeline 46 is closed by valve 46a and line 47 is opened to allow communication with larger slot 37. Piston head 28 has a radial taper 27a in piston head 28 adjacent its periphery. This design provides a smooth flow of primary fluid past the piston head since the taper is in the same direction as the flow through housing 19. Consequently, the pressure drop is held to a minimum.

*Operation*

The proportioning valve 10 is operatively connected to water tank 12, tank 14 containing a foam stabilizing agent and pump 15 as shown in FIGURE 1. The flow of water from tank 12 is controlled by valve 60. With valves 60, 46a, and 47a fully opened, pump 15 is set into operation. A reduction in pressure will be transmitted to valve proportioner 10 thereby causing the piston head 28 to move away from inlet port 26 and into the interior of housing 19. This action allows water to flow into housing 19 through inlet port 26. At the same instant, the stem portion will have moved to register slots 36 and 37 with conduits 32 and 33, respectively. The simultaneous opening of port 26 and registration of the slots is accomplished by having two distances approximately equal. Reference is made to FIGURE 2 to best understand the two following dimensions: (1) The distance from the exterior surface of piston head 28 to the most remote edges 36a and 37a of slots 36 and 37 respectively; and (2) the distance from the point where tapered wall 48 joins inlet port 26 to the nearest surface of conduits 32 and 33.

Piston 27 will move away from inlet port 26 until the force of coil spring 38 reaches a state of equilibrium with the reduction of pressure created by pump 15. When piston 27 reaches the position as shown in phantom in FIGURE 2 an opening is created defined by the distance between the lateral edge 29 of piston head 28 and tapering wall portion 48. Wall portion 48 tapers in a divergent manner inwardly in the direction of flow through housing 19 to provide a variable orifice by coacting with head 28. Slots 36 and 37 are proportioned to provide an ever increasing area in registration with conduits 32 and 33, respectively. Slots 36 and 37 will deliver a predetermined proportion of secondary liquid, which in this instance is a foam forming liquid through stem 35 and out the end thereof to mix with the water passing through tubular housing 19 and into pipe 16. There is in effect a mixing chamber formed by this action around the end of stem 35 which has moved into pipe 16. The foam solution will flow through pipe 16, into and out of pump 15 to a bank of nozzles 18 from where it will be directed at a fire. Nozzles 18 are of the standard aspirating type allowing air to mix with the water and foaming agent to produce stabilized foam.

As the rate of flow of water is increased to a greater degree, piston 27 will travel towards sleeve 34 until shoulder 40 abuts against stop face 41. At this point the valve proportioner is in a wide open position. Should piston 27 tend under the force of spring 38 to return when the flow is stopped at a fast rate toward inlet port 26 its rate of return is diminished substantially by ring 44 compressing the fluid trapped in compartment 43. Water will slowly escape from compartment 43 since a slight gap is provided between the ring and the compartment. It will be apparent that a dash-pot is formed by compartment 43 with liquid therein and ring 44 compressing the fluid until it has completely escaped. When the ring 44 has been assembled onto the stem 35 as shown in FIGURE 2, the ring 44 is considered to be a part of the stem 35.

From the foregoing description it is evident that proportioning valve 10 is in effect a variable orifice system, in which a definite area relationship is maintained between the primary fluid orifice, as represented by inlet port 26, and the secondary fluid orifices represented by slots 36 and 37. This system is employed to control the pressure drop through the proportioning valve so that a desirable pressure drop can be maintained throughout the entire range of flow capacity. This makes it possible to assure maximum proportioning accuracy over a wide range of flow.

The advantages of a variable orifice system can best be appreciated by understanding the principles involved when a hydraulic fluid flows through an orifice. Three factors must be considered. These are first, the area of the orifice; second, the coefficient of discharge which is controlled by the configuration of the orifice; and third, the pressure available to force the fluid through the orifice. Mathematically speaking, the flow rate through an orifice is proportional to the area of the orifice times the coefficient of discharge times the square root of the pressure drop through the orifice. This is a simplified relationship and does not take into account density and other factors required to arrive at actual units of flow.

If the available pressure for forcing the secondary fluid through the secondary orifice is exactly the same as the pressure drop through the primary orifice, the pressure factor can be cancelled out and the relative flow through each orifice will be equal to the area times the discharge coefficient. In the variable orifice system it is therefore necessary to adjust the area of the secondary orifice in a manner that takes into account its discharge coefficient as compared to the discharge coefficient of the primary orifice. The actual area of the secondary orifice or orifices 36 and 37 will not maintain a constant relationship with the area of the primary orifice 26 because the discharge coefficients of the two orifices will necessarily be different. For example, the discharge coefficient of the primary orifice in the present proportioning valve will be fairly high and perhaps between .8 and 1.0. The discharge coefficient of the secondary orifices comprised of slots 36 and 37 in stem 35 will also be fairly high for small openings. It will fall to a lower level of perhaps about .6 as piston 27 moves to increase the registration of slots 36 and 37 with conduits 46 and 47. This difference in coefficients is compensated for by increasing the width of slots 36 and 37 so that the area of the secondary orifice formed by the slots increases more rapidly than the area of the primary orifice. This is the purpose of the trapezoidal shape of the slots. In this manner, a constant ratio of secondary flow to primary flow can be maintained so far as area and coefficient of discharge are concerned. This could also be accomplished by adjusting the shape of the primary orifice by providing a curved or concave surface in the valve body rather than the 26° conical shape now used. From a practical viewpoint it is easier to change the slots in the piston.

In the above discussion the effect of pressure has been eliminated by assuming that the supply pressure of the secondary fluid will be exactly equal to the supply pressure of the primary fluid. Even though water tank 12 and foam tank 14 are positioned at the same height above proportioning valve 10, to provide essentially the same head pressure, variations do occur. The amount of pressure difference that can be tolerated depends upon the pressure drop through the valve which is controlled by the action of spring 38 tending to move piston head 28 towards the inlet portion and thereby reducing the size of the primary orifice until the pressure drop balances against the spring force. The pressure on the discharge side of the proportioning valve is equal to the primary fluid supply pressure minus the pressure drop through the primary orifice. In a like manner the pressure drop of the secondary liquid through the secondary orifice is equal to the supply pressure of the secondary fluid minus the pressure on the discharge end of the valve. It will be seen that the pressure drop or driving force through the secondary orifice may be greater or smaller than the pressure drop through the primary orifice depending on the difference in supply pressure between the secondary liquid and the primary liquid.

Assuming that the area of the secondary orifice has been properly proportioned to the area of the primary orifice and taking into account the effect of discharge coefficient, the relative flow through the primary and secondary orifices is proportional to the square root of the pressure drop through each orifice. If the pressure drop through the primary orifice is relatively high, a small variation of secondary supply pressure will have only a minor effect on the flow rate through the secondary orifice. Thus it is desirable to use an orifice system that will give a substantial pressure drop to maintain reasonable proportioning accuracy without resorting to precision control of the supply pressure of each fluid.

The present proportioner 10 operates with a high degree of accuracy in a 5 inch line for flow rates ranging from 50 to 1250 gallons per minute. It will be seen by the solid line projection in the graph of FIGURE 6 that the pressure drop of valving device 10 remains almost constant from a flow rate of 50 gallons per minute to 750 g.p.m. Also shown in FIGURE 6 in broken lines, is the square curve of the pressure drop of a valve proportioning device employing a fixed orifice as would be the case if no spring were employed in the proportioner. A pressure drop of only 4 p.s.i. is therefore shown by comparison to be very low over a wide range of flow rates. One will have a desired pressure drop but excessive energy will not have to be unduly wasted by a pump as is the case where a valving proportioner is employed having much greater pressure drops.

Trapezoidal slots 36 and 37 of piston 27 are of different dimensions, however, they could be the same. Slot 36 is adapted to provide a 3% solution with the water while slot 37 is dimensioned to allow sufficient foaming material therethrough to form a 6% solution. This of course, is at any stage of their registration with conduits 32 and 33 and in proportion to opening of piston 27 with respect to tapering wall 48. With both slots employed a 9% solution will be produced. Should either a 3% or a 6% solution be desired the 6% slot will be closed off in the first instance by closing line 47 by means of valve 47a and the 3% slot 36 by closing line 46 in a similar manner in the second instance.

The present proportioning valve has been described for use on the vacuum side of a foam pump. It is a reduction in pressure within the tubular valve housing which causes piston 27 to move away from inlet portion 26 and slots 36 and 37 to register with conduits 46 and 47, respectively. If desired the valve proportioner can be placed on the pressure side of any suitable water pump (not shown) or a pressurized line, and the force of the water against the face of the piston head will cause it to be forced into the interior of the valve housing and to effect the necessary registration of slots 36 and 37. Since pressure is being exerted on the water the same pressure must be provided for the foam stabilizing material if accurate proportioning is to be effected.

Water and a foam stabilizing agent have been employed as examples of primary and secondary liquids, respectively. It should be understood that various types of primary and secondary liquids can be proportioned in the present valving device. For example, in the chemical field, two liquid chemical agents can be proportioned and in the petroleum industry gasolines can be blended by the present apparatus. Since valve proportioner 10 employs two separate conduits 32 and 33 it is apparent that two different secondary liquids can be proportioned by attaching pipes 46 and 47 to separate sources of supply rather than a single tank 14. In the alternative, only a single conduit need be employed if desired for a single liquid.

It will thus be apparent that through the present invention a foam proportioning device has been described which is simple in design and employs only one moving part. Consequently, there is very little wear and no need of calibration changes. Because of its simplicity in construction, and aided by the tapered piston head, water passes through the tubular housing 19 in a relatively unobstructed manner. A substantially high pressure drop is also eliminated through the present proportioning valve. Further, any undesirable transverse movement of the piston stem is prevented and accurate proportioning is at all times assured.

It will be apparent that certain modifications and changes will be necessary for adaptation to specific materials, from time to time as will be suggested to those skilled in the art. It is intended that all such modifications and changes as come within the spirit of this invention are intended as being within its scope as best defined by the appended claims wherein there is claimed:

1. A liquid proportioning assembly adapted for use in pipe lines comprising, a generally cylindrical tubular housing providing an inlet port with an inwardly tapering wall adjacent said inlet port, a piston having a hollow stem and a head adapted to substantially close said inlet port, a stationary sleeve within said housing adapted to slidably receive said stem member and to align said head with said inlet port, two intake conduits in communication with said sleeve, means to stop the flow of liquid through each said conduit, said stem having two slots therein for registration with each said conduit when said piston head is moved away from said inlet port, the inwardly tapering wall coacting with said piston head to provide an opening of variable dimensions and said slots designed to provide an area of registration with said conduits in proportion to the opening of said orifice, said slots being of a dimension to allow different amounts of liquids to pass therethrough when said slots are in registration with said conduit members with the most remote portion of said slots away from said piston head adapted to communicate with said conduits simultaneously and at the moment said piston head moves away from said inlet port, means to resiliently urge said piston head toward said inlet port, stopping means associated with said piston to prevent said piston head from completely passing through said inlet port, and means associated with said stem member to prevent a transverse movement of said stem member.

2. The assembly of claim 1 wherein the slots are of a trapezoidal configuration to provide an ever increasing area of registration with said conduits as said piston moves away from said inlet port.

3. The assembly of claim 2 wherein said intake conduits are diametrically opposite and said means to resiliently urge said piston head toward said inlet port is a coil spring disposed between said piston head and said conduit members.

4. A liquid proportioning assembly adapted for use in pipe lines comprising, a generally cylindrical tubular housing providing an annular inlet port with an inwardly tapering wall portion adjacent said inlet port, a piston having a hollow stem and a head presenting a smooth surface adapted to substantially close said inlet port, a stationary sleeve in axial alignment with said inlet port within said housing and adapted to slidably receive said stem member, two diametrically opposite intake conduits in communication with said sleeve, said sleeve extending in opposite directions from said conduits, means to stop the flow of liquid through each said conduit, said stem having two slots therein for registration with each said conduit when said piston is moved away from said inlet port, the inwardly tapering wall coacting with said piston head to provide an opening of variable dimensions between said piston head and said wall and said slots designed to provide an area of registration with said conduits in proportion to the opening of said orifice, said slots being of a dimension to allow different amounts of liquids to pass therethrough when said slots are in registration with said conduits with the most remote portion of said slots away from said piston head adapted to communicate with said conduits simultaneously and at the moment said piston head moves away from said inlet port, a coil spring disposed between said piston head and said conduits to resiliently urge said piston head towards said inlet port, stopping means associated with said piston stem and said sleeve extending away from said inlet port to prevent said piston head from completely passing through said inlet port, and means associated with said stem member to prevent a transverse movement of said stem member.

5. The assembly of claim 4 wherein said piston head has an outwardly radial taper adjacent the periphery extending in the direction of flow through said housing.

6. The assembly of claim 4 wherein said stem and said sleeve extending away from said inlet port defines both said stopping means and a dash-pot for said stem member.

7. A liquid proportioning assembly, comprising: a housing having an inlet port, said housing having an internal wall in communication with said inlet port and an outlet port, a stationary sleeve within said housing, a piston having a piston head movable away from and toward said inlet port and having a stem slidably received in said sleeve, means for urging said piston head toward said inlet port, first and second spaced apart ports in said stem, said stem having an opening in communication with said first and second ports providing communication with any liquid which has passed through said inlet port, first and second conduits opening through said sleeve for registration with the respective first and second ports, said piston head coacting with said internal wall of said housing to define a variable orifice, said first port and said first conduit defining a first variable area of registration and said second port and said second conduit defining a second but different variable area of registration from that of said first area of registration, each of said first and second variable areas of registration being proportioned to enable flow in substantially direct proportion to flow through said variable orifice, means for selectively interrupting flow through any of said first and second conduits, and means coacting between said stem and said sleeve for guiding said stem within said sleeve so that said first and second ports register with said first and second conduits, respectively, when said piston is moved in a direction opening said inlet port.

References Cited in the file of this patent
UNITED STATES PATENTS

| | | |
|---|---|---|
| 1,000,398 | Gentle | Aug. 15, 1911 |
| 3,010,466 | Tillson | Nov. 28, 1961 |

FOREIGN PATENTS

| | | |
|---|---|---|
| 1,006,442 | Germany | Apr. 18, 1957 |